(12) United States Patent
Janssen et al.

(10) Patent No.: US 11,773,889 B2
(45) Date of Patent: Oct. 3, 2023

(54) ELECTRO OPTICAL COMPONENT FOR FITTING INTO A PRODUCT WALL, PRODUCT COMPRISING A WALL AND FITTING METHOD

(71) Applicant: SIGNIFY HOLDING B.V., Eindhoven (NL)

(72) Inventors: Merlijn Antonius Petrus Janssen, Dolaszewo (PL); Jacek Kloska, Dolaszewo (PL); Michal Kochel, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 921 days.

(21) Appl. No.: 16/633,858

(22) PCT Filed: Jul. 18, 2018

(86) PCT No.: PCT/EP2018/069518
§ 371 (c)(1),
(2) Date: Jan. 24, 2020

(87) PCT Pub. No.: WO2019/020462
PCT Pub. Date: Jan. 31, 2019

(65) Prior Publication Data
US 2020/0166067 A1    May 28, 2020

(30) Foreign Application Priority Data
Jul. 25, 2017   (EP) .................................... 17182997

(51) Int. Cl.
*F16B 21/04*        (2006.01)
*C02F 1/32*         (2023.01)
(Continued)

(52) U.S. Cl.
CPC .............. *F16B 21/04* (2013.01); *C02F 1/325* (2013.01); *F16B 19/008* (2013.01); *F16B 21/08* (2013.01); *C02F 2201/004* (2013.01)

(58) Field of Classification Search
CPC ........ F16B 21/04; F16B 19/008; F16B 21/08; F16B 21/09; C02F 1/325; C02F 2201/004; F21V 21/02; F21V 31/005
See application file for complete search history.

(56) References Cited

U.S. PATENT DOCUMENTS 3,697,742 A    10/1972  Bobrick
6,116,749 A     9/2000  Quiogue et al.
(Continued)

FOREIGN PATENT DOCUMENTS

CN    101137866 A    3/2008
CN    104094046 A    10/2014
(Continued)

*Primary Examiner* — Seung C Sohn

(57) ABSTRACT

A design is provided for a component and for an opening in a wall of a product which is to receive the component. The component has a barrel for passing through the opening with a set of lugs at the end of the barrel. Each lug has a clamping surface facing a head part of the component, and the region between the clamping surface and the head part forms a clamping zone. The opening is for example circular. A stepped thickness portion of the wall follows an arc from a locally thinnest portion to a locally thickest portion. The steps and/or the lugs are sloped upwardly towards the locally thickest end of the arc. To fit the component, it is inserted through the opening (for example with the lugs deforming inwardly) and then twisted. The twisting engages the lugs with the stepped thickness portion, providing a progressive ratcheted clamping function.

10 Claims, 4 Drawing Sheets

(51) Int. Cl.
*F16B 19/00* (2006.01)
*F16B 21/08* (2006.01)

(56) References Cited

U.S. PATENT DOCUMENTS

| | | | |
|---|---|---|---|
| 7,500,766 B1 | | 3/2009 | Reynolds |
| 9,891,081 B2 | * | 2/2018 | Henzler ................ G01L 19/147 |
| 2003/0121130 A1 | | 7/2003 | Buscart et al. |
| 2008/0198607 A1 | | 8/2008 | Goto |
| 2012/0000291 A1 | * | 1/2012 | Christoph .............. G01D 11/30 |
| | | | 403/349 |
| 2012/0236577 A1 | | 9/2012 | Cheng |
| 2014/0008547 A1 | | 1/2014 | Strik et al. |
| 2015/0078013 A1 | | 3/2015 | Vogt et al. |

FOREIGN PATENT DOCUMENTS

| | | |
|---|---|---|
| DE | 202006004077 U1 | 8/2007 |
| EP | 1861652 A1 | 12/2007 |
| GB | 1408907 A | 10/1975 |
| JP | 2016152212 A | 8/2016 |
| WO | 2016150718 A1 | 9/2016 |

* cited by examiner

ELECTRO OPTICAL COMPONENT FOR FITTING INTO A PRODUCT WALL, PRODUCT COMPRISING A WALL AND FITTING METHOD

CROSS-REFERENCE TO PRIOR APPLICATIONS

This application is the U.S. National Phase application under 35 U.S.C. § 371 of International Application No. PCT/EP2018/069518, filed on Jul. 18, 2018, which claims the benefit of European Patent Application No. 17182997.1, filed on Jul. 25, 2017. These applications are hereby incorporated by reference herein.

FIELD OF THE INVENTION

This invention relates to a component for mounting in a wall of a product. The component may be an electrical and/or optical component for example for providing an output (e.g. light) or performing a sensing function.

BACKGROUND OF THE INVENTION

There are many types of product in which components are desired to be mounted through a wall of the product.

Examples include switches, lights, buttons, speakers, microphones, control dials, thermometers and other sensors.

In some examples, the fitting of the component needs to provide a seal. A liquid-tight seal is for example required if the wall of the product defines a liquid storage vessel, for example. One example is a water storage vessel. The component may then comprise a visible light source for providing illumination into the vessel, or a UV light source for providing water purification. A gas tight seal may be needed in other applications, or there may instead only be a requirement for a dust proof barrier.

The mounting of a component in a wall of a product typically requires the wall to be clamped between an outer flange of the component and a coupling on the opposite side, such as a fixing nut.

FIG. 1 shows the typical mounting of a component through an opening of wall of a product. The product wall 10 has an opening 12 through which a threaded shaft 14 is inserted. A nut 16 is screwed over the threaded shaft 14 such that the product wall 10 is clamped between a flange 18 and the nut 16. An O-ring seal 20 enables a watertight or gastight or dustproof fit (as required) and provides a locating function as well.

There are therefore parts of the component which are needed specifically for the fitting of the component to the product wall, and this means additional cost as well as additional component handling. It also needs access to both sides of the wall 10 to fit the component (unless there is an additional component to hold the nut 16 in place and prevent its rotation).

There is therefore a need for a more simple design to enable the fitting of a component into an opening in a product or housing wall.

SUMMARY OF THE INVENTION

According to examples in accordance with an aspect of the invention, there is provided an electro-optical component for installation through an opening in a wall, wherein the electro-optical component comprises a head part (26) having a flange (30), a barrel (28a) extending from the head part (26) towards a barrel end wherein the barrel is arranged for passing through the opening of the wall. The electro-optical component further comprises a cover portion (32) for covering the head part (26), the cover portion (32) comprising a region forming a light transmissive window, wherein the cover portion is arranged to extend over the flange and to provide a compression seal between the electro-optical component and the wall.

In one embodiment the electro-optical component further comprises a fastener for securing the component to the wall. This fastener may be, for example a nut that is arranged to tighten on a threaded portion formed on the exterior of the barrel. In a further embodiment the fastener may be a bolt that cooperates with a threaded portion that is formed on the interior of the barrel. In a yet further embodiment, the fastener may comprise a set of lugs on the barrel, these may be at the barrel end opposite to the head part. These lugs may project radially outwardly, wherein each lug has a clamping surface facing the head part.

In one embodiment this component may be installed through an opening from one side only of the opening, by inserting the component through the opening and performing a twist function. The lugs are then able to ride up a suitably designed ramp which forms part of the product wall to provide a clamping function. The clamping surface is used to define a ratchet type connection thus providing automatic locking into a desired compression state. The coupling unit may be an existing part of the component, such as the main housing, and this means no additional components are needed. This reduces handling and therefore saves time and expense.

The component may have a set of three lugs. This provides a balanced clamping force around the opening. They are preferably evenly spaced around the circumference of the barrel. The barrel itself is preferably circular cylindrical. There may be more lugs if desired.

The clamping surface of the lugs may be parallel to the plane of the product wall, or they may be sloped, for example having a slope of between 5 degrees and 25 degrees (to the plane of the product wall). This slope can then match a slope of the ramp (of the product wall) so that a parallel contact face is provided. The steps provide a click lock function and prevent reverse rotation of the lugs.

The coupling unit may comprise a flange, and the head part comprises a cover portion over the flange. The cover portion provides the face which presses against the product wall typically to provide a seal as mentioned above, although it may just be to provide an aesthetically pleasing design. The flange provides the fixing for holding the cover portion in place.

The cover portion may thus comprise a sealing element, for example formed of a rubber. In this way, the cover portion functions as the seal, without needing an addition O-ring seal. The cover portion may however still be an existing part of the design of the component, such as an optical component.

The lugs are preferably elastically deformable radially inwardly, so that they may bend inwardly when the component is inserted through the opening in the wall. In this way, the opening may be a circle. The cover portion makes contact with the product wall beyond the radial extent of the opening, so that a seal is provided around the opening. This can be considered as a mechanical seal, such as a compression seal. A compression seal (also known as a sealing gland) is intended to seal an element when that element must pass through a pressure or environmental boundary. The compression seal may perform three functions; 1, it restrains the element from moving due to a pressure difference. 2, it prohibits the leakage of gas or liquid media along the element. 3, it may electrically isolate the electro-optical device from the mounting location on the wall. The cover portion may also include a sealing ring which projects into an annular space between the radial outer edge of the barrel and the inner surface of the wall opening. Thus, a seal may be provided against the outer surface of the wall as well as against the inner surface of the opening.

The electro-optical component may be an electrical component, an optical component or a sensor (for example a pressure sensor, an optical sensor, a temperature sensor, a humidity sensor, a particle sensor or a gas sensor).

In one example, the component comprises a lighting element. This may be for providing light externally for a user of the product or it may be for providing light into a vessel, for example for water purification, or for water lighting purposes such as for a pool or aquarium, or for other volume lighting purposes such as for a terrarium.

The component may comprise a sensor, for example for sensing in an air duct or as part of a heating, ventilation and air conditioning system (HVAC).

In the case of a lighting element, it for example comprises a lighting unit mounted inside the coupling unit and a cover portion over the coupling unit which forms a light exit window. This cover portion is then the same cover portion which provides the seal against the product wall. The lighting unit for example comprises a UV LED module.

In the case of a photodetector element, it for example comprises a photodetector mounted inside the coupling unit and a cover portion over the coupling unit which forms a light entry window. This cover portion is then the same cover portion which provides the seal against the product wall. The light entry or exit window may be termed a light transmissive window of the cover. This light transmissive window may be a region of the cover or the entire cover may be light transmissive.

According to another aspect of the invention, there is provided a product comprising a wall having an opening for receiving a component, wherein the wall comprises:

the opening which is circular; and a set of a stepped thickness portions radially outside the opening, and on the side of the wall opposite a side against which the component is to be mounted, wherein each stepped thickness portion follows an arc, extending from a locally thinnest portion to a locally thickest portion.

This product is designed to receive the component defined above. The component is inserted through the opening by the lugs deforming inwardly. They may have ramped outer faces for this purpose. By rotating the component, the clamping surface of each lug rides along the stepped arc, progressively increasing the clamping force. The steps provides a ratchet function which locks the clamping force in place.

The outer wall is preferably plastic. The resilience and elasticity needed for the component to ride over the steps of the stepped thickness portion is thus predominantly provided by the component, for example by the cover portion.

A stop is preferably provided at the locally thickest end of the stepped thickness portion. At the stop position, a pre-designed clamping force and compression of the component (in particular the cover portion) is provided.

The invention also provides a device comprising:
a product as defined above; and
a component as defined above installed through the opening of the wall of the product, wherein the clamping surface of each lug is pressed against a step of the stepped thickness portion.

The component is for example an electrical component, an optical component or a sensor.

The device is for example a water purification device.

The invention also provides a method of fitting a component through an opening in a wall of a product, comprising:

inserting a coupling unit of the component through the opening, the coupling unit comprising a barrel and a set of lugs on the barrel; and rotating the component such that a clamping surface of each lug rides along a stepped thickness portion of the wall which follows an arc, which stepped thickness portion extends from a locally thinnest portion to a locally thickest portion, wherein the steps are sloped upwardly towards the locally thickest end of the arc, wherein, when the lugs are engaged with the locally thickest portion after the rotation, a head part of the component is clamped against the product wall.

This method provides a simple push, twist and lock function for fitting the component. It can all be performed from one side, and the component can only subsequently be removed from the other side by releasing the snap locking of the lugs and pushing the lugs radially inwardly.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a design for a component and a design for an opening in a wall of a product which is to receive the component. The component has a barrel for passing through the opening with a set of lugs at the end of the barrel which project radially outwardly. Each lug has a clamping surface facing a head part of the component, and the region between the clamping surface and the head part forms a clamping zone. The opening is preferably circular. A stepped thickness portion of the wall follows an arc from a locally thinnest portion to a locally thickest portion. The steps and/or the lugs are sloped upwardly towards the locally thickest end of the arc. To fit the component, it is inserted through the opening (for example with the lugs deforming inwardly) and then twisted. The twisting engages the lugs with the stepped thickness portion, providing a progressive ratcheted clamping function.

Figure 1:
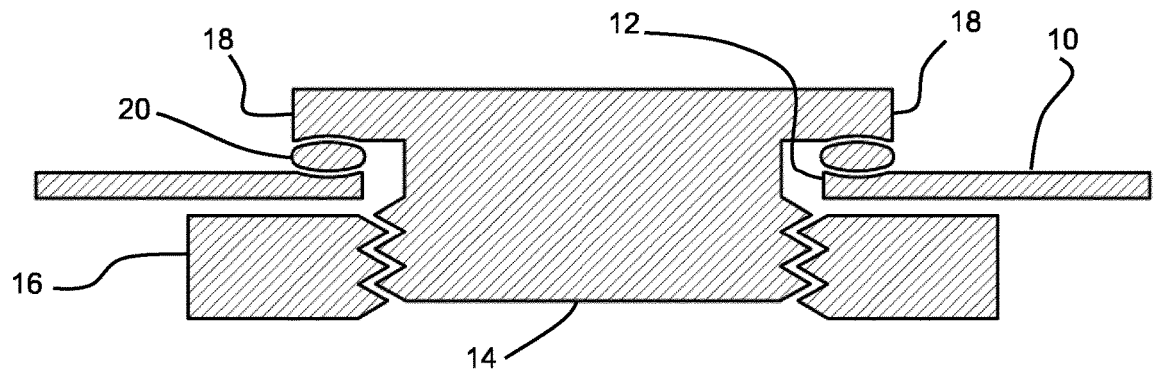
FIG. 1 shows a known coupling arrangement for fitting a component to a wall of a product.
Figure 2:
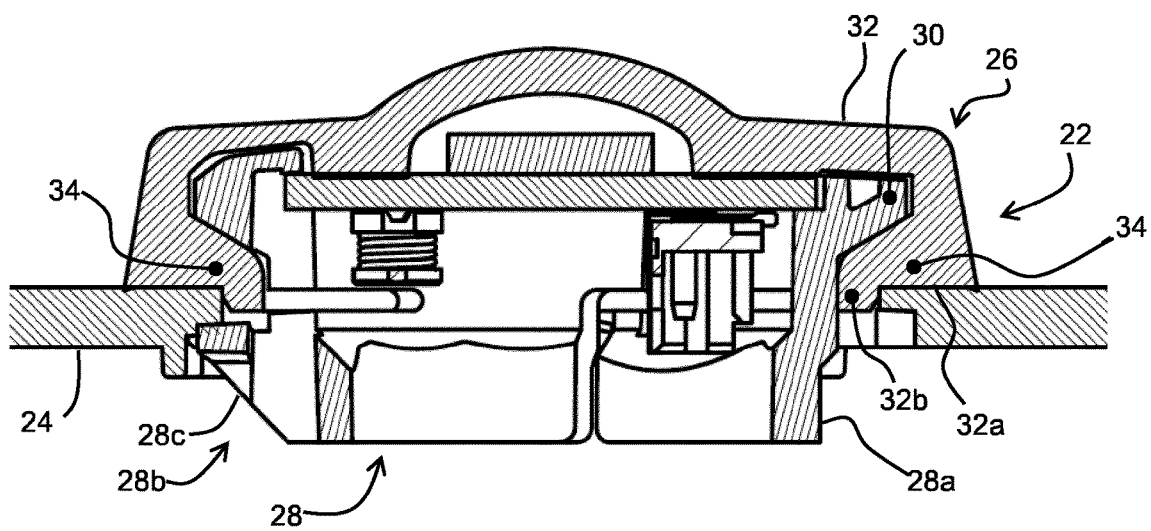
FIG. 2 shows a component fitted into an opening of a wall of a product.

FIG. 2 shows a component 22 fitted into an opening of a wall 24 of a product in cross section.

The component comprises a head part 26 for mounting against an outer side of the product wall 24. The component is coupled to the wall 24 by a coupling unit 28. The coupling unit 28 has a barrel 28a for passing through the opening of the product wall, which projects from the head part 26 and a set of lugs 28b at the end of the barrel opposite the head part 26.

The lugs 28b (which can be seen more clearly in later figures) extend radially outwardly from the barrel, and there is a cut-away portion of the barrel behind them. The lugs are elastically deformable radially inwardly into this cut-away portion. The outer edge of the lug has a ramp surface 28c. This surface engages with the opening in the product wall so that as the component is pushed into the opening, the ramp surface 28c causes the lugs to deform radially inwardly. They snap back after the component is inserted.

The coupling unit 28 has a flange 30 at a top part and the head part 26 comprises a cover portion 32 over the flange 30. The cover portion 32 has a bottom face 32a which presses against the product wall 24 preferably to provide a seal. The flange 30 holds the cover portion 32 in place so that a region 34 of the cover portion can be clamped between the flange 30 and the product wall 24 thus function in the same way as an O-ring seal.

The cover portion 32 also has a lip 32b which extends into a radial space between the opening in the wall 24 and the outer surface of the barrel 28a.

The cover portion 32 for example comprises a sealing element, which may comprise a rubber such as silicone. Note that the cover portion 32 may instead be an integral part of the coupling unit 28 giving a one-piece design instead of a two-piece design.

The cover portion 32 extends radially outwardly beyond the opening in the wall 24 to provide the sealing face 32a.

Figure 3:
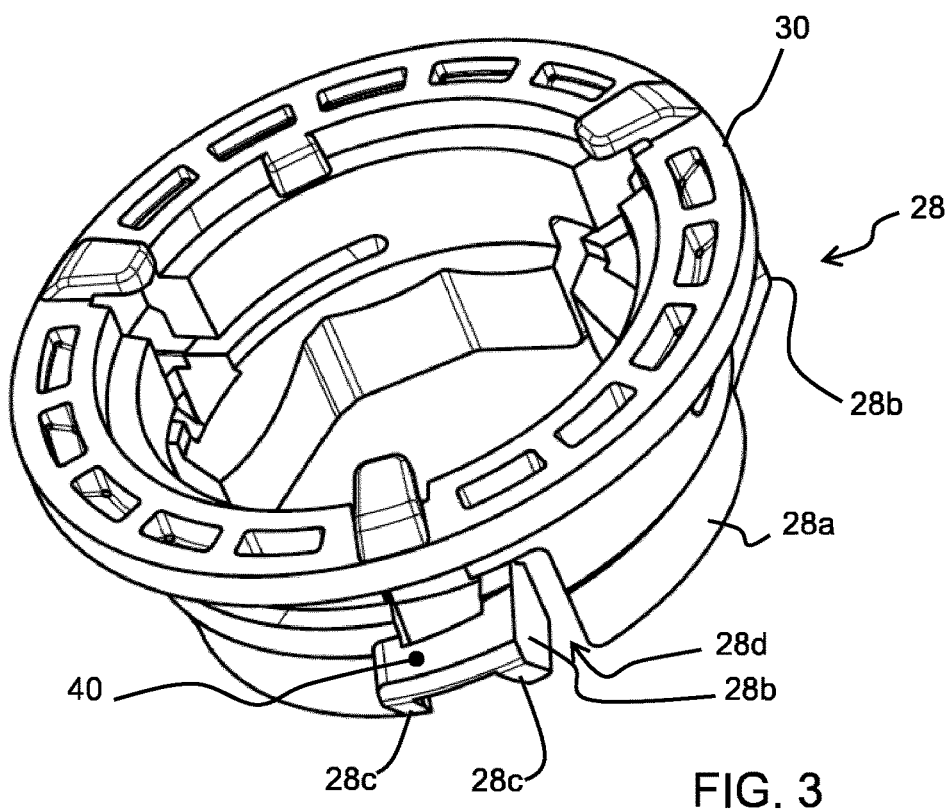
FIG. 3 shows the design of the coupling unit in perspective view.

FIG. 3 shows the design of the coupling unit 28 in perspective view.

There are three lugs 28b spaced evenly circumferentially around the barrel 28a. The lugs 28b project radially outwardly from the barrel 28a, and each lug has a clamping surface 40 facing the flange 30 and hence the head part. The region between the clamping surface 40 and the head part forms a clamping zone. FIG. 3 shows the cut-out in the barrel as 28d.

Figure 4:
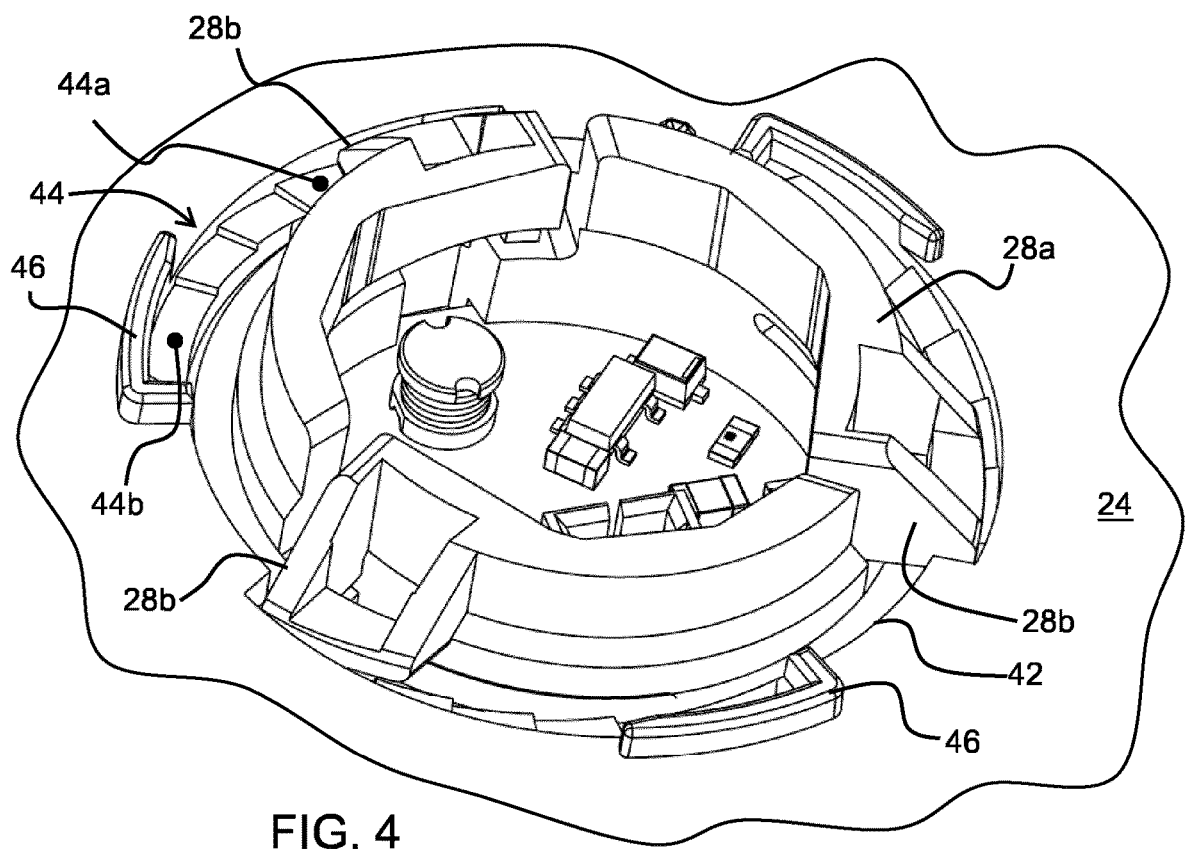
FIG. 4 shows the component inserted through the wall of the product, from beneath.

FIG. 4 shows the component inserted through the wall 24 of the product, from beneath. The barrel 28a projects through the opening 42. On the side of the wall 24 opposite the side against which the component is sealed, there are three stepped thickness portions 44 (one for each lug).

The stepped thickness portion 44 follows an arc, extending from a locally thinnest portion 44a to a locally thickest portion 44b. The steps are sloped upwardly towards the end of the arc at the thickest portion 44b. Thus the stepped thickness portion generally increases in thickness, with a series of step drops which function as locking features.

Figure 5:
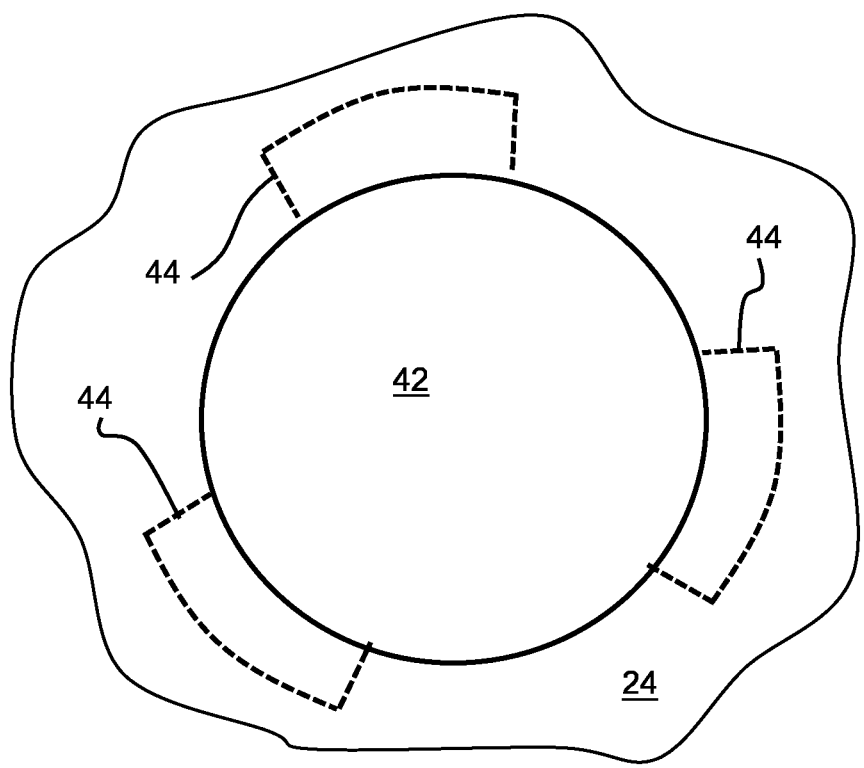
FIG. 5 shows the shape of the opening.

As shown in FIG. 5, the opening 42 is circular. The stepped thickness portions 44 are each formed as a recess into the back side of the wall 24 (FIG. 5 shows the wall from the side into which the component is inserted).

Figure 6:
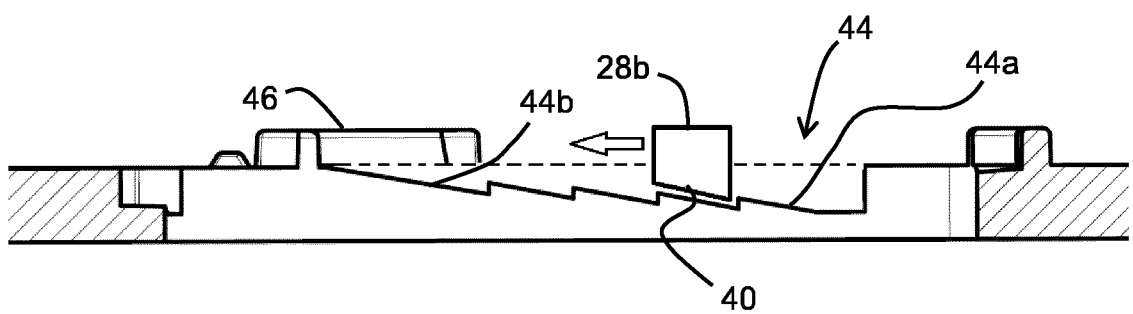
FIG. 6 shows in schematic form the shape of the stepped thickness portion of the product wall.

FIG. 6 shows in schematic (and unrolled) form the shape of the stepped thickness portion 44 of the product wall 24. In this example the clamping surfaces are sloped as well as the steps, and the slope of the steps matches the slope of the clamping surface 40 of the lugs 28b so that a parallel interface is formed. The slope is for example between 5 degrees and 25 degrees to the plane of the flange 30 (i.e. the plane of the product wall 24). The slope means the lugs ride up the slope when rotated and then drop over the edge to provide a snap function. Note that the lugs may instead be flat, and the ratchet function will still take place.

The component is installed through the opening 42 from one side only by inserting the component through the opening and performing a twist function. The lugs deform inwardly during the initial insertion and then snap back. For the initial insertion, a rotational orientation is used such that the lugs pass to the locally thinnest end of the stepped thickness portion 44. During subsequent rotation, the lugs 28b ride up the stepped thickness portion to provide a locked clamping function. The lug 28b shown schematically in FIG. 6 moves to the left during the twist function. The lug 28b rides up the slope of the stepped thickness portion 44 compressing the cover portion 32. The elasticity of the cover portion 32 means that it recovers after a step has been crossed thus providing a ratchet type function so that the lugs 28b cannot be turned the other way. The snapping back of the lugs means the component can then no longer be removed from the wall from the main component side (i.e. from the top in FIG. 2), and the locked rotation means the seal is maintained because the components cannot rotate back to release pressure on the seal provided by the cover portion. There is a progressively increasing clamping force applied as the lugs are rotated.

A stop 46 is provided at the locally thickest end 44b of the stepped thickness portion 44 for limiting rotation of the lug. At the stop position, a pre-designed clamping force and compression of the component (in particular the cover portion 32) is provided. The stop 46 is also shown in FIG. 4.

Figure 7:
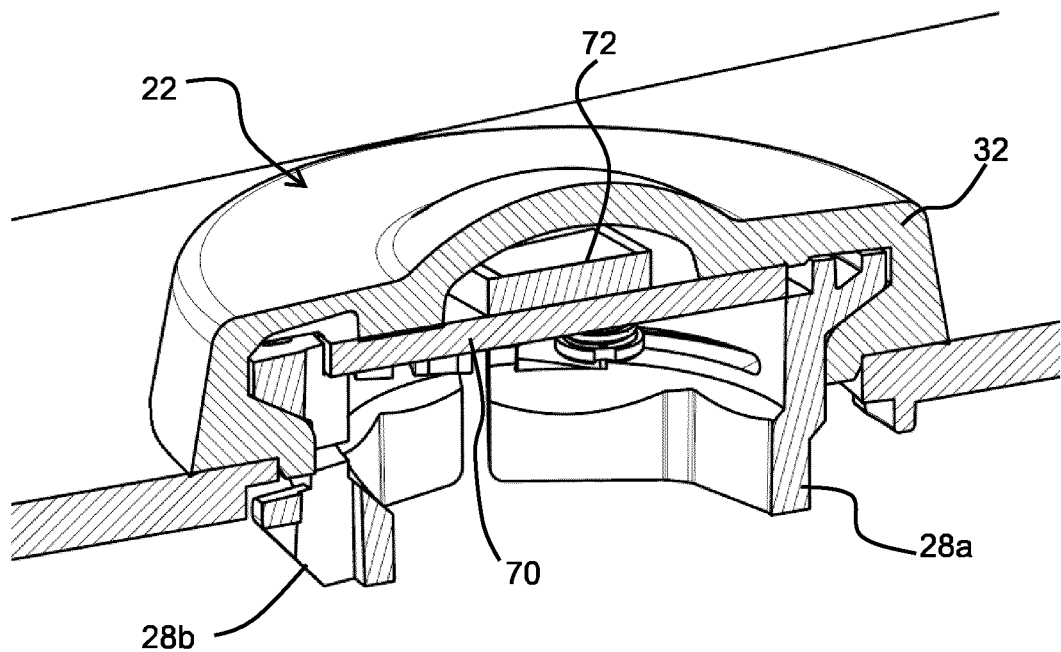
FIG. 7 shows a cut away view of the installed component.

FIG. 7 shows a cut away view of the installed component 22. The component is in this example a lighting element. There is a circuit board 70 which carries a lighting unit 72 such as a visible LED for illumination or a UV LED for water purification. The cover portion 32 functions as an optical output window. Thus, it performs an optical function as well as a sealing function and a function of elastically lifting the head part to prevent reverse rotation of the lugs 28b along the stepped thickness portion 44.

Figure 8:
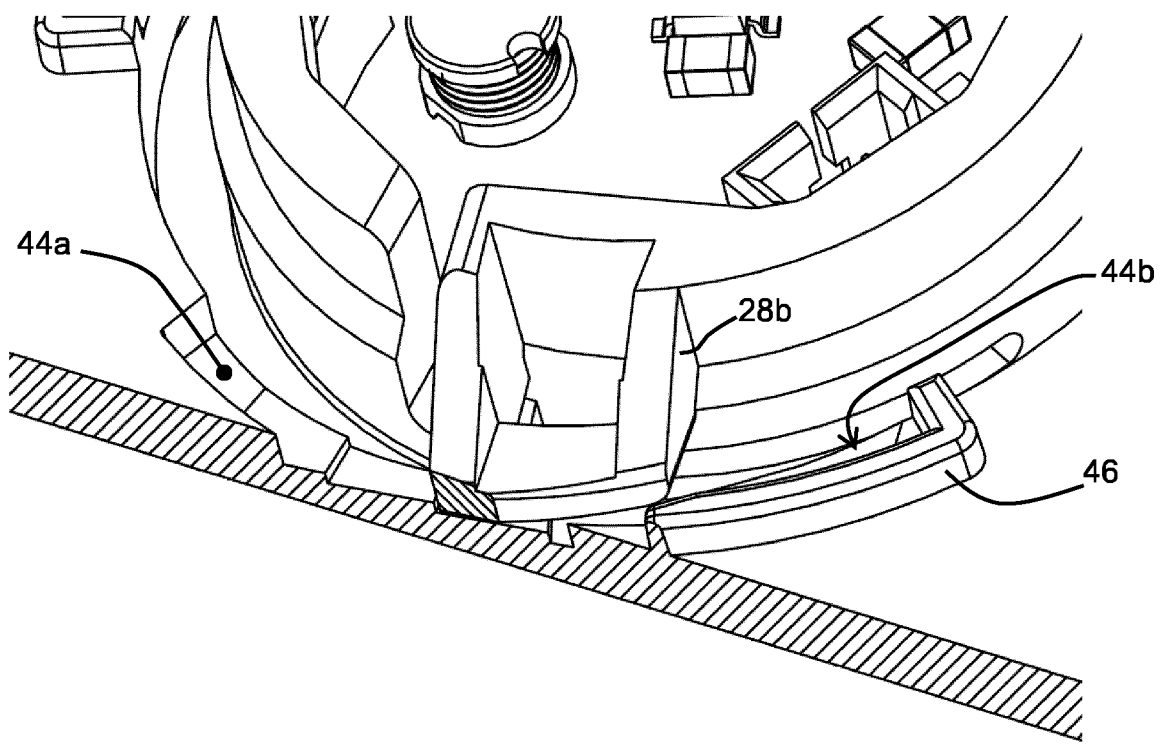
FIG. 8 shows the stepped thickness portion in more detail with the lug of the inserted component.

FIG. 8 shows the stepped thickness portion 44 in more detail with the lug 28b of the inserted component.

To remove the component, access is needed from the bottom (with reference to the orientation in FIG. 2). The component needs to be rotated in the opposite direction to release the clamping force and this can be achieved by pushing on the steps while rotating the component. The lugs need to be pushed inwardly to enable the component to pass back out from the wall.

The invention also provides the overall device which combines the product with its housing wall 24 and the component 22 installed through the opening of the wall of the product. The overall device is for example a water purification device.

As explained above the invention also provides a method of fitting a component through an opening in a wall of a product. The first step is to insert the coupling unit part through the opening. The component is then rotated such that the clamping surface of each lug rides along the stepped thickness portion. When the lugs are engaged with the locally thickest portion 44b, the head part of the component is clamped against the product wall.

This method provides a simple push, twist and lock function for fitting the component. It can all be performed from one side, and the component can only subsequently be removed from the other side by releasing the snap locking of the lugs.

The invention may be employed for the attachment of any type of device through a wall of another device, for example to provide stimulation (e.g. lighting or heating) or sensing (optical, thermal) or to provide user interface (microphone, speaker, control buttons) at one side of the wall, for example with electrical connection from the other side. The example of a water purification device is just one example of many.

The invention is thus generally of interest for the mechanical fixation of any electrical, optical or sensing component which needs a gas tight, or liquid tight or dust proof seal.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An electro-optical component for installation through an opening in a wall, wherein the electro-optical component comprises:
   a head part for mounting against an outer side of the wall, and
   a coupling unit,
   wherein the coupling unit comprises:
   a flange at a top part of the coupling unit,
      a barrel extending from the top part of the coupling unit towards a barrel end, the barrel being arranged for passing through the opening of the wall,
   wherein the head part comprises a cover portion, the cover portion being arranged to extend over the flange and to function as a light transmissive window, and
   wherein the flange is arranged to hold the cover portion in place so that a region of the cover portion can be clamped between the flange and the wall to provide a compression seal between the electro-optical component and the wall.

2. The electro-optical component as claimed in claim 1, wherein the electro-optical component is a lighting element.

3. The electro-optical component as claimed in claim 2, wherein the lighting element comprises a UV LED module.

4. The electro-optical component as claimed in claim 1, wherein the electro-optical component is a photodetector.

5. The electro-optical component as claimed in claim 1, wherein the electro-optical component further comprises a fastener for securing the electro-optical component to the wall.

6. The electro-optical component as claimed in claim 5, wherein the fastener comprises a nut arranged to cooperate with a threaded portion formed on the barrel.

7. The electro-optical component as claimed in claim 5, wherein the fastener comprises a set of lugs on the barrel opposite the head part, which project radially outwardly, and wherein each lug has a clamping surface facing the head part.

8. The electro-optical component as claimed in claim 7, wherein the lugs are elastically deformable radially inwardly.

9. A device comprising:
   a product comprising a wall with a circular opening and a set of a stepped thickness portions radially outside the opening on a first side of the wall, each stepped thickness portion following an arc extending from a locally thinnest portion to a locally thickest portion; and
   an electro-optical component as claimed in claim 7,
   wherein the electro-optical component is installed through the opening of the wall of the product;
   and mounted against a second side of the wall opposite to the first side of the wall, and
   wherein the clamping surface of each lug is pressed against a step of a stepped thickness portion.

10. A device as claimed in claim 9, comprising a water purification device.

* * * * *